United States Patent
Walker et al.

(10) Patent No.: US 10,585,624 B2
(45) Date of Patent: Mar. 10, 2020

(54) MEMORY PROTOCOL

(71) Applicant: Micron Technology, Inc., Boise, ID (US)

(72) Inventors: Robert M. Walker, Raleigh, NC (US); Frank F. Ross, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 128 days.

(21) Appl. No.: 15/366,504

(22) Filed: Dec. 1, 2016

(65) Prior Publication Data

US 2018/0157439 A1    Jun. 7, 2018

(51) Int. Cl.
*G06F 3/06* (2006.01)
*G06F 13/42* (2006.01)
*G06F 13/16* (2006.01)

(52) U.S. Cl.
CPC ............ *G06F 3/0659* (2013.01); *G06F 3/061* (2013.01); *G06F 3/0656* (2013.01); *G06F 3/0679* (2013.01); *G06F 13/16* (2013.01); *G06F 13/4234* (2013.01)

(58) Field of Classification Search
CPC ................................ G06F 3/0659; G06F 3/055
See application file for complete search history.

(56) References Cited

U.S. PATENT DOCUMENTS

| | | |
|---|---|---|
| 5,452,311 A | 9/1995 | Wells et al. |
| 5,574,944 A | 11/1996 | Stager |
| 5,590,345 A | 12/1996 | Barker et al. |
| 5,774,683 A | 6/1998 | Gulick |
| 5,937,423 A | 8/1999 | Robinson |
| 7,711,889 B2 | 5/2010 | Kudo et al. |
| 7,904,644 B1 | 3/2011 | Pinvidic et al. |
| 7,924,521 B1 | 4/2011 | Hudiono et al. |
| 7,983,107 B2 | 7/2011 | Moshayedi et al. |

(Continued)

FOREIGN PATENT DOCUMENTS

| | | |
|---|---|---|
| TW | 201314437 A | 4/2013 |
| WO | 2010002753 A1 | 1/2010 |

(Continued)

OTHER PUBLICATIONS

Shah, Agam, What's in HPE's persistent memory?, PCWorld, Apr. 1, 2016 https://www.pcworld.com/article/3051133/whats-in-hpes-persistent-memory.html (Year: 2016).*

(Continued)

*Primary Examiner* — Prasith Thammavong
*Assistant Examiner* — Edmund H Kwong
(74) *Attorney, Agent, or Firm* — Brooks, Cameron & Huebsch, PLLC

(57) ABSTRACT

The present disclosure includes apparatuses and methods related to a memory protocol. An example apparatus can execute a read command that includes a first chunk of data and a second chunk of data by assigning a first read identification (RID) number to the first chunk of data and a second RID number to the second chunk of data, sending the first chunk of data and the first RID number to a host, and sending the second chunk of data and the second RID number to the host. The apparatus can be a non-volatile dual in-line memory module (NVDIMM) device.

32 Claims, 3 Drawing Sheets

(56) References Cited

U.S. PATENT DOCUMENTS

| | | |
|---|---|---|
| 8,719,492 B1 | 5/2014 | Asnaashari |
| 8,769,192 B2 | 7/2014 | Yeh |
| 8,874,831 B2 | 10/2014 | Lee et al. |
| 9,128,634 B1 | 9/2015 | Kang et al. |
| 2003/0110322 A1 | 6/2003 | Wolrich et al. |
| 2004/0148482 A1 | 7/2004 | Grundy et al. |
| 2004/0260908 A1 | 12/2004 | Malik et al. |
| 2008/0082751 A1 | 4/2008 | Okin et al. |
| 2008/0189452 A1 | 8/2008 | Merry et al. |
| 2008/0195800 A1 | 8/2008 | Lee et al. |
| 2009/0006787 A1 | 1/2009 | De Souza et al. |
| 2009/0164869 A1 | 6/2009 | Chuang |
| 2009/0276556 A1 | 11/2009 | Huang |
| 2010/0250827 A1 | 9/2010 | Jullien et al. |
| 2011/0170346 A1 | 7/2011 | Nagai et al. |
| 2011/0268256 A1* | 11/2011 | Ootsuka ............ H04M 1/24 379/1.01 |
| 2011/0320651 A1 | 12/2011 | Poublan et al. |
| 2012/0020161 A1 | 1/2012 | Haukness |
| 2012/0131253 A1 | 5/2012 | McKnight et al. |
| 2012/0159052 A1 | 6/2012 | Lee et al. |
| 2013/0019057 A1 | 1/2013 | Stephens |
| 2013/0262745 A1* | 10/2013 | Lin ............ G06F 3/061 711/103 |
| 2014/0229699 A1 | 8/2014 | Gurgi et al. |
| 2014/0269088 A1 | 9/2014 | Pichen |
| 2014/0351492 A1 | 11/2014 | Chen |
| 2015/0012687 A1* | 1/2015 | Huang ............ G06F 3/0659 711/103 |
| 2015/0052318 A1 | 2/2015 | Walker |
| 2015/0212738 A1* | 7/2015 | D'Eliseo ............ G06F 3/0659 711/154 |
| 2015/0234601 A1 | 8/2015 | Tsai et al. |
| 2015/0279463 A1 | 10/2015 | Berke |
| 2015/0331638 A1 | 11/2015 | Zaltsman et al. |
| 2015/0363106 A1 | 12/2015 | Lim et al. |
| 2016/0026577 A1 | 1/2016 | Goodwin |
| 2016/0041907 A1 | 2/2016 | Jung et al. |
| 2016/0070483 A1 | 3/2016 | Yoon et al. |
| 2016/0118121 A1 | 4/2016 | Kelly et al. |
| 2016/0232112 A1 | 8/2016 | Lee |
| 2016/0306566 A1* | 10/2016 | Lu ............ G06F 13/385 |
| 2017/0308306 A1 | 10/2017 | Intrater |
| 2017/0351433 A1 | 12/2017 | Walker et al. |
| 2018/0260329 A1 | 9/2018 | Galbraith et al. |

FOREIGN PATENT DOCUMENTS

| | | |
|---|---|---|
| WO | 2013007870 A1 | 1/2013 |
| WO | 2015116468 A1 | 8/2015 |

OTHER PUBLICATIONS

Perepelitsa, Costya, Quora—Why do we use registers instead of memory?, 2015 https://www.quora.com/Why-do-we-use-registers-instead-of-memory (Year: 2015).*

International Search Report and Written Opinion from related international application No. PCT/US2017/063581, dated Mar. 19, 2018, 13 pp.

International Search Report and Written Opinion from international patent application No. PCT/US2017/034487, dated Oct. 25, 2017, 22 pp.

International Search Report and Written Opinion from international application No. PCT/US2017/029780, dated Jul. 18, 2017, 11 pp.

Office Action from Taiwanese patent application No. 106114938, dated Jan. 18, 2018, 7 pp.

Decision of Rejection from Taiwanese patent application No. 106114938, dated May 24, 2018, 6 pp.

Office Action from related Taiwanese patent application No. 106118556, dated May 11, 2018, 10 pp.

Search Report from European patent application No. 17793026.0, dated Mar. 13, 2019, 7 pp.

Office Action from related Taiwanese patent application No. 106142145, dated Dec. 12, 2018, 16 pp.

Office Action from Chinese patent application No. 201780026941.4, dated Jul. 10, 2019, 12 pp.

* cited by examiner

| | |
|---|---|
| 350-1 → RA-1 | CO-1 |
| 350-2 → RA-2 | CO-2 |
| 350-3 → RA-3 | CO-3 |
| 350-4 → RA-4 | CO-4 |
| 350-5 → RA-5 | CO-5 |
| 350-6 → RA-6 | CO-6 |
| 350-7 → RA-7 | CO-7 |
| 350-8 → RA-8 | CO-8 |
| 350-9 → RA-9 | CO-9 |
| 350-10 → RA-10 | CO-10 |
| 350-11 → RA-11 | CO-11 |
| 350-12 → RA-12 | CO-12 |
| 350-13 → RA-13 | CO-13 |
| 350-14 → RA-14 | CO-14 |

*Fig. 3*

MEMORY PROTOCOL

TECHNICAL FIELD

The present disclosure relates generally to memory devices, and more particularly, to apparatuses and methods for a memory protocol.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. Non-volatile memory may be used in, for example, personal computers, portable memory sticks, digital cameras, cellular telephones, portable music players such as MP3 players, movie players, and other electronic devices. Memory cells can be arranged into arrays, with the arrays being used in memory devices.

Memory can be part of a memory module (e.g., a dual in-line memory module (DIMM)) used in computing devices. Memory modules can include volatile, such as DRAM, for example, and/or non-volatile memory, such as Flash memory or RRAM, for example. The DIMMs can be using a main memory in computing systems.

BRIEF DESCRIPTION OF THE DRAWINGS

FIG. 3 is a diagram of a number of registers in accordance with a number of embodiments of the present disclosure.

DETAILED DESCRIPTION

Figure 1:
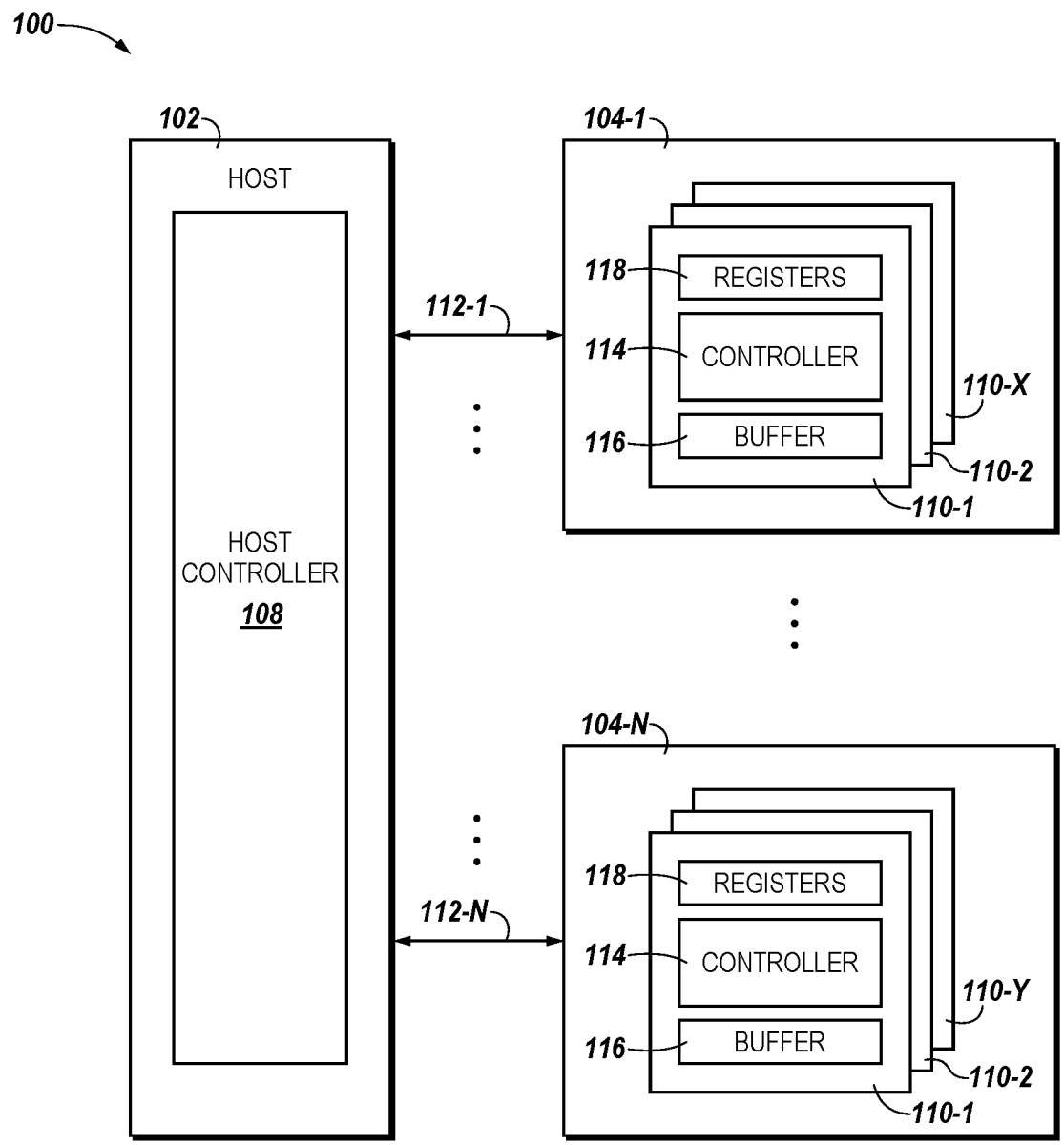
FIG. 1 is a block diagram of an apparatus in the form of a computing system including a memory system in accordance with a number of embodiments of the present disclosure.

The present disclosure includes apparatuses and methods related to a memory protocol. An example apparatus can execute a read command that includes a first chunk of data and a second chunk of data by assigning a first read identification (RID) number to the first chunk of data and a second RID number to the second chunk of data, sending the first chunk of data and the first RID number to a host, and sending the second chunk of data and the second RID number to the host.

In a number of embodiments, a read command can include a number of chunks of data and the chunks of data associated with the read command can be returned in a particular order. The order in which the chunks of data are returned can be indicated by settings in the memory device or by bits in the read command. Also, chunks of data associated with different read commands can be sent to the host consecutively or by interleaving chunks of data from different commands. The chunks of data associated with read commands can also be sent based on when the memory device has access to the data, so that a chunk that is accessed first is sent to the host first.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designator "N" indicates that a number of the particular feature so designated can be included with a number of embodiments of the present disclosure.

As used herein, "a number of" something can refer to one or more of such things. For example, a number of memory devices can refer to one or more of memory devices. Additionally, designators such as "N", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1 is a functional block diagram of a computing system 100 including an apparatus in the form of a number of memory systems 104-1 . . . 104-N, in accordance with one or more embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. In the embodiment illustrated in FIG. 1, memory systems 104-1 . . . 104-N can include a one or more dual in-line memory modules (DIMM) 110-1, . . . , 110-X, 110-Y. The DIMMs 110-1, . . . , 110-X, 110-Y can include volatile memory and/or non-volatile memory. In a number of embodiments, memory systems 104-1, . . . , 104-N can include a multi-chip device. A multi-chip device can include a number of different memory types and/or memory modules. For example, a memory system can include non-volatile or volatile memory on any type of a module. The examples described below in association with FIGS. 1-4 use a DIMM as the memory module, but the protocol of the present disclosure can be used on any memory system where memory can execute non-deterministic commands. In FIG. 1, memory system 104-1 is coupled to the host via channel 112-1 can include DIMMs 110-1, . . . , 110-X, where DIMM 110-1 is a NVDIMM and 110-X is DRAM DIMM. In this example, each DIMM 110-1, . . . , 110-X, 110-Y includes a controller 114. Controller 114 can received commands from host 102 and control execution of the commands on a DIMM. Also, in a number of embodiments, the protocol of the present disclosure could be implemented by a memory device (e.g., a DIMM) without a controller and execution of the commands using the protocol of the present disclosure could be built into the memory device. The host 102 can send commands to the DIMMs 110-1, . . . , 110-X, 110-Y using the protocol of the present disclosure and/or a prior protocol, depending on the type of memory in the DIMM. For example, the host can use the protocol of the present disclosure to communicate on the same channel (e.g., channel 112-1) with a NVDIMM and a prior protocol to communicate with a DRAM DIMM that are both on the same memory system. The host and the NVDIMM can communicate via read ready (R_RDY) signals, read send (R_SEND) signals, write credit increment (WC_INC) signals, and read identification (RID) signals according the protocol of the present disclosure. The read ready (R_RDY) signals, read send (R_SEND) signals, write credit increment (WC_INC) signals, and read identification (RID) signals can be sent via pins that are unused in a prior protocol (e.g. DDR4) or are pins from a prior protocol (e.g. DDR4) that are repurposed (e.g. used differently) so that the present protocol is compatible with the prior protocol. Also, pins can be assigned to the read ready (R_RDY) signals, read send (R_SEND) signals, write credit increment (WC_INC) signals, and read identification (RID) signals in protocols that are being developed (e.g., DDR5).

As illustrated in FIG. 1, a host 102 can be coupled to the memory systems 104-1 . . . 104-N. In a number of embodiments, each memory system 104-1 . . . 104-N can be coupled to host 102 via a channel. In FIG. 1, memory system 104-1 is coupled to host 102 via channel 112-1 and memory system 104-N is coupled to host 102 via channel 112-N. Host 102 can be a laptop computer, personal computers, digital camera, digital recording and playback device, mobile telephone, PDA, memory card reader, interface hub, among other host systems, and can include a memory access device, e.g., a processor. One of ordinary skill in the art will appreciate that "a processor" can intend one or more processors, such as a parallel processing system, a number of coprocessors, etc.

Host 102 includes a host controller 108 to communicate with memory systems 104-1 . . . 104-N. The host controller 108 can send commands to the DIMMs 110-1, . . . , 110-X, 110-Y via channels 112-1 . . . 112-N. The host controller 108 can communicate with the DIMMs 110-1, . . . , 110-X, 110-Y and/or the controller 114 on each of the DIMMs 110-1, . . . , 110-X, 110-Y to read, write, and erase data, among other operations. A physical host interface can provide an interface for passing control, address, data, and other signals between the memory systems 104-1 . . . 104-N and host 102 having compatible receptors for the physical host interface. The signals can be communicated between 102 and DIMMs 110-1, . . . 110-X, 110-Y on a number of buses, such as a data bus and/or an address bus, for example, via channels 112-1 . . . 112-N.

The host controller 108 and/or controller 114 on a DIMM can include control circuitry, e.g., hardware, firmware, and/or software. In one or more embodiments, the host controller 108 and/or controller 114 can be an application specific integrated circuit (ASIC) coupled to a printed circuit board including a physical interface. Also, each DIMM 110-1, . . . , 110-X, 110-Y can include buffers 116 of volatile and/or non-volatile memory and registers 118. Buffer 116 can be used to buffer data that is used during execution of read commands and/or write commands. The buffer 116 can be split into a write buffer and a read buffer. The amount of space that is dedicated to the write buffer and the amount of space dedicated to the read buffer can be controlled by the host controller 108. The host can control the amount of space in the buffer 116 dedicated to the write buffer and the read buffer based on the type of commands that are being sent to a particular DIMM. In a number of embodiments, the DIMM can have a fixed write buffer size and/or a fixed read buffer size. Registers 118 can be programmed to set order in which chunks of data associated with a command will be returned to the host 102 by the DIMMs 110-1, . . . , 110-X, 110-Y.

The DIMMs 110-1, . . . , 110-X, 110-Y can provide main memory for the memory system or could be used as additional memory or storage throughout the memory system. Each DIMM 110-1, . . . , 110-X, 110-Y can include one or more arrays of memory cells, e.g., non-volatile memory cells. The arrays can be flash arrays with a NAND architecture, for example. Embodiments are not limited to a particular type of memory device. For instance, the memory device can include RAM, ROM, DRAM, SDRAM, PCRAM, RRAM, and flash memory, among others.

The embodiment of FIG. 1 can include additional circuitry that is not illustrated so as not to obscure embodiments of the present disclosure. For example, the memory systems 104-1 . . . 104-N can include address circuitry to latch address signals provided over I/O connections through I/O circuitry. Address signals can be received and decoded by a row decoder and a column decoder to access the memory devices 110-1, . . . , 110-N. It will be appreciated by those skilled in the art that the number of address input connections can depend on the density and architecture of the DIMMs 110-1, . . . , 110-X, 110-Y.

Figure 2A:
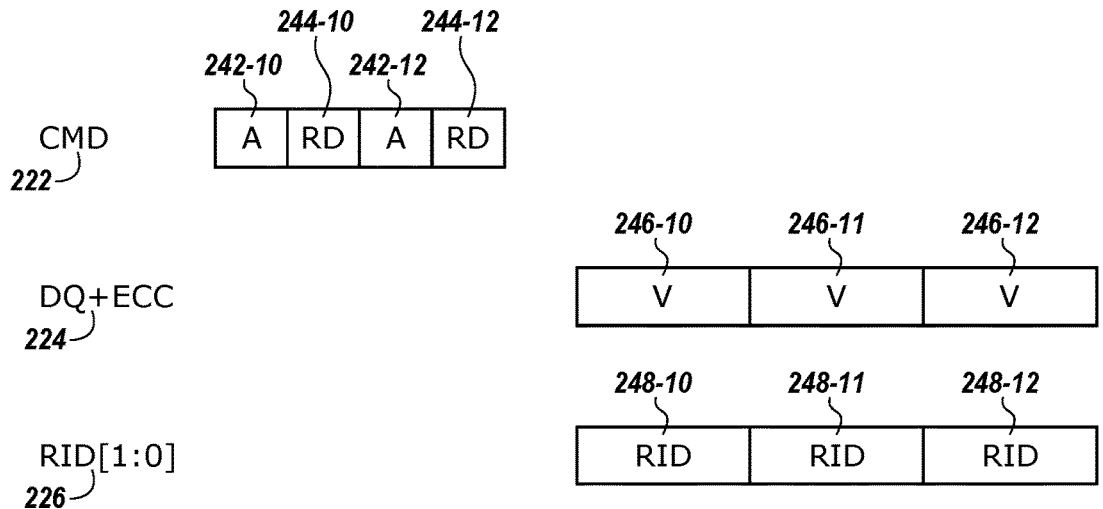
FIGS. 2A-2B are diagrams of a number of reads operations in accordance with a number of embodiments of the present disclosure.
Figure 2B:
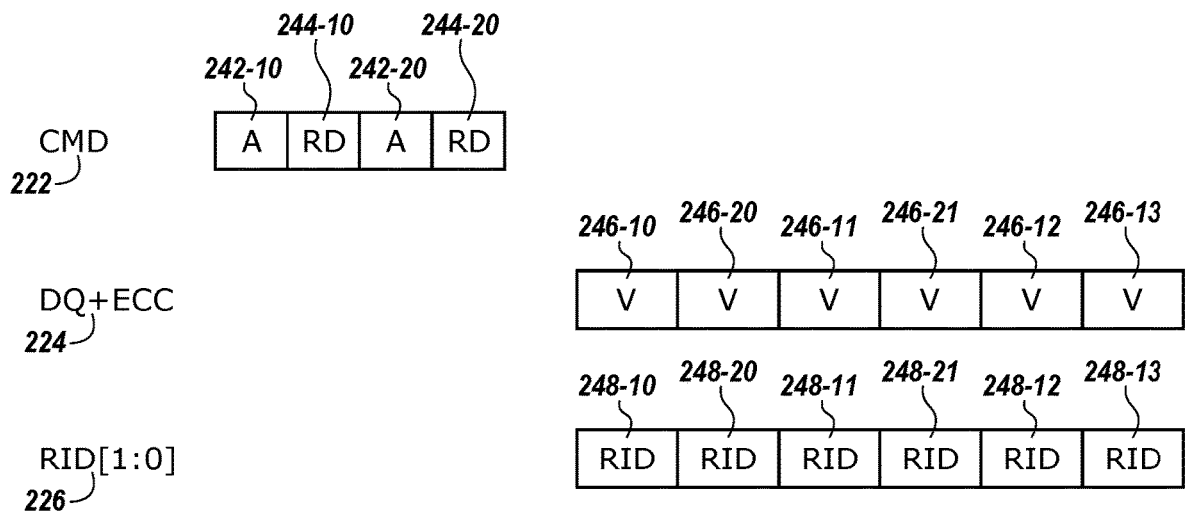

FIGS. 2A-2B are diagrams of a number of reads operations in accordance with a number of embodiments of the present disclosure. FIG. 2A illustrates an example of performing two read operations. A command signal 222 can be sent from the host to the NVDIMM. Command signal 222 can include activate commands and read commands. In FIG. 2A, a first activate command 242-10, a first read command 244-10, a second activate command 242-12, and a second read command 244-12 are sent from the host to the NVDIMM. The read commands can include an indication of a quantity of data that is associated with the commands (e.g., a number of chunks of data associated with the read command). For example, read command 244-10 can be associated with 2 64B chunks of data and read command 244-12 can be associated with 1 64B chunk of data. A chunk of data can be an amount of data that is transferred between a host and the NVDIMM. The host can assign a host read identification (RID) number to the read command. The host RID number can be included in the read command and transmitted to the NVDIMM when sending the read command from the host to the NVDIMM. In FIG. 2A, first read command 244-10 can be assigned a host RID of 10 and the second read command 244-12 can be assigned a host RID of 12. The host can assign host RID numbers by incrementing the previous assigned host RID number by a value equal to or greater than the quantity of the number of chunks of data associated with the previous read command. For example, in FIG. 2A, the first read command 244-10 was assigned a host RID of 10 and the second read command 244-12 was assigned a host RID of 12 because the read command was associated with two chunks of data. The NVDIMM will use a memory device RID of 11 for the second chunk of data associated with the first read command 244-10, so RID 11 was skipped by the host when assigning the second command 244-12 a host RID.

The read command can also include an indication of an order in which the chunks of data associated with the read commands are to be returned. The read command can include a register address, which the NVDIMM can use to locate a register that indicates an order in which to return the chunks of data associated with the read command. The read command can also include an indication that a particular chunk of data associated with the read command is to be returned with priority. For example, the read command can include an indication that a particular chunk of data, such as the second chunk and/or the chunk of data that was addressed in the read command, is to be returned first. Also, the read command can include an indication that the chunks of data are to be returned in an order based to when the NVDIMM accesses the chunks of data associated with the command. For example, if the third chunk of data associated with a read command is accessed first, then the third chunk of data is first returned to the host.

The read command can also include a number of bits, e.g., lower address bits, to indicate a priority associated with the command and an order in which to return the chunks of data. The bits, e.g., lower address bits, can indicate low or high priority, e.g., whether or not the chunks of data associated with the command should be return before chunks of data associated with other commands, and/or random or in order return of chunks of data. The bits, e.g., lower address bits, that indicate random return of chunks of data can also indicate that chunks of data are returned with a critical chunk priority, e.g., the critical chunk is returned first, or that chunks of data are returned on a first ready first returned basis. For example, when 3 bits are used to indicate priority and order, an address sequence of 000 can indicate low priority with in order return of data chunks, an address sequence of 001 can indicate low priority with random return of data chunks on a first ready first returned basis, an address sequence of 010 can indicate low priority with random return of data chunks with a critical chunk priority, an address sequence of 100 can indicate high priority with in order return of data chunks, an address sequence of 101 can indicate high priority with random return of data chunks on a first ready first returned basis, and an address sequence of 110 can indicate low priority with random return of data chunks with a critical chunk priority.

In a number of embodiments, the NVDIMM can also return chunks of data sequentially and/or interleaved, which can be programmed in a mode register of the NVDIMM. When return chunks sequentially, the first chunk of data associated with a command is returned first, the second chunk of data associated with a command is returned second, and so on. When interleaving chunks, a chunk of data associated with a particular command can be followed by a chunk associated with a different command.

In the protocol of the present disclosure, the read commands can be sent one after another without regard to timing parameters. This allows commands to be sent sooner than having to space the commands out due to clock timing parameters, therefore the NVDIMM can start processing the commands sooner which can reduce latency for the commands.

In FIG. 2A, once the NVDIMM has received the read commands 244-10 and 244-12, the NVDIMM can determine how many chunks of data are associated with the read commands 244-10 and 244-12. The NVDIMM can inspect the buffer and/or cache of the NVDIMM and in the non-volatile memory of the NVDIMM to locate the data associated with the read commands 244-10 and 244-12. Once the controller locates the data and has the data ready to send back to the host, the NVDIMM controller can send a read ready command to the host. When a NVDIMM receives a number of read commands, the NVDIMM controller returns chunks of data associated the read commands in an order based on an indication in the read commands and/or a setting on the NVDIMM. For example, if the read command includes a register address, the NVDIMM controller locates the register at that address which indicates the order in which the data associated with a read command is to be return.

In FIG. 2A, read command 244-10 can include a register address for a register that indicates the first chunk of data associated with the command is to be returned and then the second chunk of data associated with the command is to be returned. A read ready indicator can be sent to the host by toggling (e.g., transitioning) a read ready signal from low to high or high to low to indicate that the first chunk of data associated read command 244-10 is ready to be sent to the host. The host can detect the read ready indicator by detecting the transition of the read ready signal. In response to receiving the read ready indicator, the host can send a read send indicator to the NVDIMM controller to indicate that the host is ready to receive the data associated with the read command 244-10. The read send indicator can be sent by the host to the NVDIMM controller at any time and without regard to timing parameters. The host can control traffic on the data bus by timing when read send commands are sent to the NVDIMM controller. The read send indicator can include toggling a read send signal from low to high, which is detected by the NVDIMM controller. The NVDIMM controller can, in response to receiving the read send indicator, send the first chunk of data 246-10 associated with read command 244-10 on the DQ+ECC pins 224. Also, a read identification (RID) signal 248-10 is sent to the host on the RID pins 226 when the chunk of data 246-10 sent to the host. The RID signal 248-10 includes the memory device RID number assigned to the chunk of data by the NVDIMM and is used to identify the read command associated with the chunk of data 246-10 that is sent to the host. Data chunk 246-10 is assigned a memory device RID number of 10. Due to the NVDIMM command being able to respond to read commands in an order that is different to the order in which the read commands are received, the host will not know with which read command a particular data transmission is associated without the RID signal. The RID signal can include n-bits, where n is 1 or more bits. For example, the RID signal can be transmitted on a 2 bit RID bus. The number of outstanding reads the host can issue can be dependent on the number of bits in the RID signal, the number of beats in the data packet, and the number of reads the NVDIMM controller can support. For example, if the data burst is 8 beats and the RID signal is 2 bits, the number of outstanding reads that the host can issue is $2^{2*8}$=65,536. Also, a NVDIMM may have a register that can be read by the host to further restrict the number of outstanding read commands that the host can issue and the host can keep track of the number of outstanding reads that the host has issued.

A read ready indicator can be sent to the host by toggling (e.g., transitioning) a read ready signal from low to high or high to low to indicate that the second chunk of data associated read command 244-10 is ready to be sent to the host. The host can detect the read ready indicator by detecting the transition of the read ready signal. In response to receiving the read ready indicator, the host can send a read send indicator to the NVDIMM controller to indicate that the host is ready to receive the second chunk of data associated with the read command 244-10. The read send indicator can be sent by the host to the NVDIMM controller at any time and without regard to timing parameters. The host can control traffic on the data bus by timing when read send commands are sent to the NVDIMM controller. The read send indicator can include toggling a read send signal from low to high, which is detected by the NVDIMM controller. The NVDIMM controller can, in response to receiving the read send indicator, send the second chunk of data 246-11 associated with read command 244-10 on the DQ+ECC pins 224. Also, a read identification (RID) signal 248-12 is sent to the host on the RID pins 226 when the chunk of data 246-11 sent to the host. The RID signal 248-11 includes the memory device RID number assigned to the chunk of data by the NVDIMM and is used to identify the read command associated with the chunk of data 246-11 that is sent to the host. Data chunk 246-11 is assigned a memory device RID number of 11.

In a number of embodiments, a read send signal can be pulsed from low to high to low or a SEND command can be used to indicate that the host is ready to receive data. The pulsed read send signal can be timed by the host to coordinate with other signals sent to DIMMs on a common channel, which are typically captured with a clock edge, where some of the DIMMs may or may not be using the protocol of the present disclosure.

In response to receiving read command 244-12, a read ready indicator can be sent to the host by toggling the read ready signal from high to low to indicate that the chunk of data associated with read command 244-12 is ready to be sent to the host. The host can detect the read ready indicator by detecting the change in the read ready signal from high to low. In response to receiving the read ready indicator, the host can send a read send indicator to the NVDIMM controller to indicate that the host is ready to receive the chunk of data associated with the read command 224-12. The read send indicator can include toggling the read send signal from high to low, which is detected by the NVDIMM controller. The NVDIMM controller can, in response to receiving the read send indicator, send the chunk of data 246-12 associated with read command 244-12 on the DQ+ECC pins 224. Also, a read identification (RID) signal 248-2 is sent to the host on the RID pins 226 when the chunk of data 246-12 sent to the host. The RID signal 248-12 includes the memory device RID number assigned to the chunk of data by the NVDIMM and is used to identify the read command associated with the chunk of data 246-12 that is sent to the host. Data chunk 246-12 is assigned a memory device RID number of 12.

FIG. 2B illustrates an example of performing two read operations, where the chunks of data are interleaved with a critical chunk of each command being returned first. A command signal 222 can be sent from the host to the NVDIMM. Command signal 222 can include activate commands and read commands. In FIG. 2B, a first activate command 242-10, a first read command 244-10, a second activate command 242-20, and a second read command 244-20 are sent from the host to the NVDIMM. The read commands can include an indication of a quantity of data that is associated with the commands (e.g., a number of chunks of data associated with the read command). For example, read command 244-10 can be associated with 4 64B chunks of data and read command 244-20 can be associated with 2 64B chunks of data. A chunk of data can be an amount of data that is transferred between a host and the NVDIMM. The host can assign a host read identification (RID) number to the read command. The host RID number can be included in the read command and transmitted to the NVDIMM when sending the read command from the host to the NVDIMM. In FIG. 2A, first read command 244-10 can be assigned a host RID of 10 and the second read command 244-20 can be assigned a host RID of 20.

The read command can also include an indication of an order in which the chunks of data associated with the read commands are to be returned. Read command 242-10 and read command 242-20 can each include an indication that the first chunk of data associated with the read command (e.g., a critical chunk) is be returned first.

In FIG. 2B, once the NVDIMM has received the read commands 244-10 and 244-20, the NVDIMM can determine how many chunks of data are associated with the read commands 244-10 and 244-20. The NVDIMM can inspect the buffer and/or cache of the NVDIMM and in the non-volatile memory of the NVDIMM to locate the data associated with the read commands 244-10 and 244-20. Once the controller locates the data and has the data ready to send back to the host, the NVDIMM controller can send a read ready command to the host.

In FIG. 2A, transferring data to the host can begin by sending a read ready indicator to the host by toggling (e.g., transitioning) a read ready signal from low to high or high to low to indicate that the first chunk of data associated read command 244-10 is ready to be sent to the host. The host can detect the read ready indicator by detecting the transition of the read ready signal. In response to receiving the read ready indicator, the host can send a read send indicator to the NVDIMM controller to indicate that the host is ready to receive the data associated with the read command 244-10. The read send indicator can be sent by the host to the NVDIMM controller at any time and without regard to timing parameters. The host can control traffic on the data bus by timing when read send commands are sent to the NVDIMM controller. The read send indicator can include toggling a read send signal from low to high, which is detected by the NVDIMM controller. The NVDIMM controller can, in response to receiving the read send indicator, send the first chunk of data 246-10 associated with read command 244-10 on the DQ+ECC pins 224. Also, a read identification (RID) signal 248-10 is sent to the host on the RID pins 226 when the chunk of data 246-10 sent to the host. The RID signal 248-10 includes the memory device RID number assigned to the chunk of data by the NVDIMM and is used to identify the read command associated with the chunk of data 246-10 that is sent to the host. Data chunk 246-10 is assigned a memory device RID number of 10.

Transferring data to the host can continuing by sending a read ready indicator to the host by toggling (e.g., transitioning) a read ready signal from low to high or high to low to indicate that the first chunk of data associated read command 244-20 is ready to be sent to the host. The host can detect the read ready indicator by detecting the transition of the read ready signal. In response to receiving the read ready indicator, the host can send a read send indicator to the NVDIMM controller to indicate that the host is ready to receive the second chunk of data associated with the read command 244-20. The read send indicator can be sent by the host to the NVDIMM controller at any time and without regard to timing parameters. The read send indicator can include toggling a read send signal from low to high, which is detected by the NVDIMM controller. The NVDIMM controller can, in response to receiving the read send indicator, send the second chunk of data 246-20 associated with read command 244-20 on the DQ+ECC pins 224. Also, a read identification (RID) signal 248-20 is sent to the host on the RID pins 226 when the chunk of data 246-20 sent to the host. The RID signal 248-20 includes the memory device RID number assigned to the chunk of data by the NVDIMM and is used to identify the read command associated with the chunk of data 246-20 that is sent to the host. Data chunk 246-20 is assigned a memory device RID number of 20.

Once the first chunk of 246-10 associated with read command 244-20 and the second chunk of data associated with read command 244-20 have been sent to the host, the remaining chunks of data can be sent to the host interleaved. Transferring the remaining chunks of data associated with read commands 244-10 and 244-10 in an interleaved manner can continue by sending a read ready indicator to the host by toggling (e.g., transitioning) a read ready signal from low to high or high to low to indicate that the second chunk of data associated read command 244-10 is ready to be sent to the host. The host can detect the read ready indicator by detecting the transition of the read ready signal. In response to receiving the read ready indicator, the host can send a read send indicator to the NVDIMM controller to indicate that the host is ready to receive the second chunk of data associated with the read command 244-10. The read send indicator can be sent by the host to the NVDIMM controller at any time and without regard to timing parameters. The read send indicator can include toggling a read send signal from low to high, which is detected by the NVDIMM controller. The NVDIMM controller can, in response to receiving the read send indicator, send the second chunk of data 246-11 associated with read command 244-10 on the DQ+ECC pins 224. Also, a read identification (RID) signal 248-11 is sent to the host on the RID pins 226 when the chunk of data 246-11 sent to the host. The RID signal 248-11 includes the memory device RID number assigned to the chunk of data by the NVDIMM and is used to identify the read command associated with the chunk of data 246-11 that is sent to the host. Data chunk 246-11 is assigned a memory device RID number of 11.

Transferring the remaining chunks of data associated with read commands 244-10 and 244-20 in an interleaved manner can continue by sending a read ready indicator to the host by toggling (e.g., transitioning) a read ready signal from low to high or high to low to indicate that the second chunk of data associated read command 244-20 is ready to be sent to the host. The host can detect the read ready indicator by detecting the transition of the read ready signal. In response to receiving the read ready indicator, the host can send a read send indicator to the NVDIMM controller to indicate that the host is ready to receive the second chunk of data associated with the read command 244-20. The read send indicator can be sent by the host to the NVDIMM controller at any time and without regard to timing parameters. The read send indicator can include toggling a read send signal from low to high, which is detected by the NVDIMM controller. The NVDIMM controller can, in response to receiving the read send indicator, send the second chunk of data 246-21 associated with read command 244-20 on the DQ+ECC pins 224. Also, a read identification (RID) signal 248-21 is sent to the host on the RID pins 226 when the chunk of data 246-21 sent to the host. The RID signal 248-21 includes the memory device RID number assigned to the chunk of data by the NVDIMM and is used to identify the read command associated with the chunk of data 246-21 that is sent to the host. Data chunk 246-21 is assigned a memory device RID number of 21.

Transferring the remaining chunks of data associated with read commands 244-10 and 244-20 in an interleaved manner can continue by sending a read ready indicator to the host by toggling (e.g., transitioning) a read ready signal from low to high or high to low to indicate that the third chunk of data associated read command 244-10 is ready to be sent to the host. The host can detect the read ready indicator by detecting the transition of the read ready signal. In response to receiving the read ready indicator, the host can send a read send indicator to the NVDIMM controller to indicate that the host is ready to receive the third chunk of data associated with the read command 244-10. The read send indicator can be sent by the host to the NVDIMM controller at any time and without regard to timing parameters. The read send indicator can include toggling a read send signal from low to high, which is detected by the NVDIMM controller. The NVDIMM controller can, in response to receiving the read send indicator, send the third chunk of data 246-12 associated with read command 244-10 on the DQ+ECC pins 224. Also, a read identification (RID) signal 248-12 is sent to the host on the RID pins 226 when the chunk of data 246-12 sent to the host. The RID signal 248-12 includes the memory device RID number assigned to the chunk of data by the NVDIMM and is used to identify the read command associated with the chunk of data 246-12 that is sent to the host. Data chunk 246-12 is assigned a memory device RID number of 12.

Transferring the remaining chunks of data associated with read commands 244-10 and 244-20 in an interleaved manner can continue by sending a read ready indicator to the host by toggling (e.g., transitioning) a read ready signal from low to high or high to low to indicate that the fourth chunk of data associated read command 244-10 is ready to be sent to the host. The host can detect the read ready indicator by detecting the transition of the read ready signal. In response to receiving the read ready indicator, the host can send a read send indicator to the NVDIMM controller to indicate that the host is ready to receive the fourth chunk of data associated with the read command 244-10. The read send indicator can be sent by the host to the NVDIMM controller at any time and without regard to timing parameters. The read send indicator can include toggling a read send signal from low to high, which is detected by the NVDIMM controller. The NVDIMM controller can, in response to receiving the read send indicator, send the third chunk of data 246-13 associated with read command 244-10 on the DQ+ECC pins 224. Also, a read identification (RID) signal 248-13 is sent to the host on the RID pins 226 when the chunk of data 246-13 sent to the host. The RID signal 248-13 includes the memory device RID number assigned to the chunk of data by the NVDIMM and is used to identify the read command associated with the chunk of data 246-13 that is sent to the host. Data chunk 246-13 is assigned a memory device RID number of 13.

FIG. 3 is a diagram of a number of registers in accordance with a number of embodiments of the present disclosure. FIG. 3 includes registers 350-1, . . . , 350-14 having corresponding register addresses (RA-1, . . . , RA-14) and chunk orders (CO-1, . . . , CO-14). In a number of embodiments, any number of registers of any size can be used to determine an order in which to return chunks of data. Registers 350-1 and 350-2 can be addressed with 1 bit in a read command. Register 350-1 can include 6 bits and can be addressed to determine the order for returning chunks of data for commands having 2 chunks of data. Register 350-2 can include 6 bits and can be addressed to determine the order for returning chunks of data for commands having 3 chunks of data.

Registers 350-3, 350-4, 350-5, and 350-6 can be addressed with 2 bits in a read command. Register 350-3 can include 12 bits and can be addressed to determine the order for returning chunks of data for commands having 4 chunks of data. Register 350-4 can include 12 bits and can be addressed to determine the order for returning chunks of data for commands having 5 chunks of data. Register 350-5 can include 12 bits and can be addressed to determine the order for returning chunks of data for commands having 6 chunks of data. Register 350-6 can include 12 bits and can be addressed to determine the order for returning chunks of data for commands having 7 chunks of data.

Registers 350-7, 350-8, 350-9, 350-10, 350-11, 350-12, 350-13, 350-14 can be addressed with 3 bits in a read command. Register 350-7 can include 32 bits and can be addressed to determine the order for returning chunks of data for commands having 8 chunks of data. Register 350-8 can include 32 bits and can be addressed to determine the order for returning chunks of data for commands having 9 chunks of data. Register 350-9 can include 32 bits and can be addressed to determine the order for returning chunks of data for commands having 10 chunks of data. Register 350-10 can include 32 bits and can be addressed to determine the order for returning chunks of data for commands having 11 chunks of data. Register 350-11 can include 32 bits and can be addressed to determine the order for returning chunks of data for commands having 12 chunks of data. Register 350-12 can include 32 bits and can be addressed to determine the order for returning chunks of data for commands having 13 chunks of data. Register 350-3 can include 32 bits and can be addressed to determine the order for returning chunks of data for commands having 14 chunks of data. Register 350-15 can include 32 bits and can be addressed to determine the order for returning chunks of data for commands having 15 chunks of data.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a memory device; and
a controller coupled to the memory device configured to:
receive a read command from a host, wherein the read command is assigned a host read identification (RID) number that is incremented by a value equal to or greater than a quantity of a number of chunks of data associated with a previous read command, and wherein the read command includes an indication that a first chunk of data and a second chunk of data are to be returned in a particular order;
execute the read command associated with the first chunk of data and the second chunk of data by assigning a first memory device read identification (RID) number to the first chunk of data and a second memory device RID number to the second chunk of data, wherein the first memory device RID number is the host RID number, and returning to the host the first chunk of data, the first memory device RID number, the second chunk of data, and the memory device second RID number in the indicated particular order.

2. The apparatus of claim 1, wherein the memory device is a non-volatile dual in-line memory module (NVDIMM) device.

3. The apparatus of claim 1, wherein the first chunk of data is sent to the host before the second chunk of data in response to the read command including an address of the first chuck of data.

4. The apparatus of claim 1, wherein the first chunk of data is sent to the host before the second chunk of data in response to the read command including the indication indicating that the first chuck of data is to be sent before any other chunk of data associated with the read command.

5. The apparatus of claim 1, wherein the first chunk of data is sent to the host before the second chunk of data in response to the read command indication including a register address to locate a register that indicates an order in which chunks of data associated with the read command are to be returned.

6. The apparatus of claim 1, wherein the first chunk of data is sent to the host before the second chunk of data in response to the first chunk of data being ready before the second chunk of data.

7. The apparatus of claim 1, wherein the second chunk of data is sent to the host before the first chunk of data in response to the second chunk of data being ready before the first chunk of data.

8. An apparatus comprising:
a memory device; and
a controller coupled to the memory device configured to:
receive a read command from a host, wherein the read command is assigned a host read identification (RID) number that is incremented by a value equal to or greater than a quantity of a number of chunks of data associated with a previous read command, and wherein the read command includes a number of chunks of data and an indication that the number of chunks of data are to be returned to the host in a particular order;
assign memory device read identification (RID) numbers to each of the number of chunks of data, wherein a RID number for a first chunk of data of the number of chunks of data is the host RID number; and send, to the host, the number of chunks of data and the memory device RID numbers in the particular order as indicated by the read command.

9. The apparatus of claim 8, wherein the read command indication includes a register address used to locate a register that indicates the order in which the number of chunks of data associated with the read command are to be returned.

10. The apparatus of claim 8, wherein the memory device includes a number of registers that each indicate an order in which the number of chunks of data associated with the read command are to be returned.

11. The apparatus of claim 8, wherein the read command indication includes an indication that the number of chunks of data are to be returned in the particular order based on when the memory device accesses the number of chunks of data.

12. The apparatus of claim 11, wherein the read command indication includes an indication that the number of chunks of data are to be returned in sequential order.

13. The apparatus of claim 11, wherein the read command indication includes an indication that a particular chunk of the number of chunks of data is to be returned with priority.

14. An apparatus, comprising:
a memory device; and
a controller coupled to the memory device configured to:
receive a first read command and a second read command from a host, wherein the first read command is associated with a first number of chunks of data assigned a first host read identification (RID) number and the second read command includes a second number of chunks of data assigned a second host RID number, wherein a second host RID number is incremented by a value equal to or greater than a quantity of the first number of chunks of data associated with the first read command;
assign a first number of memory device RID numbers to the first number of data chunks, wherein the first number of memory device RID numbers start with the first host RID number;
assign a second number of memory device RID numbers to the second number of data chunks, wherein the second number of memory device RID numbers start with the second host RID number; and
return the first number of chunks of data with the first number of memory device RID numbers and the second number of chunks of data with the second number of memory device RID numbers to the host in a particular order indicated by the host.

15. The apparatus of claim 14, wherein the particular order includes sending a particular chunk of the first number of chunks indicated by the first read command before sending any other chunk.

16. The apparatus of claim 15, wherein the particular order includes sending a particular chunk of the second number of chunks indicated by the second read command after sending the particular chunk of the first number of chunks.

17. The apparatus of claim 14, wherein the particular order based on when the memory device accesses the first and second number of chunks of data.

18. The apparatus of claim 14, wherein the particular order is sequential order.

19. The apparatus of claim 18, wherein the particular order includes interleaving the first number of chunks with the second number of chunks in sequential order.

20. The apparatus of claim 14, wherein the particular order includes interleaving the first number of chunks with the second number of chunks based on when the memory device accesses the first and second number of chunks of data.

21. The apparatus of claim 14, wherein a first register address of the first read command and a second register address of the second read command identifies the particular order and wherein the first register address and the second register address are used to locate registers that indicate an order in which chunks of data are to be returned.

22. A method, comprising:
sending a read command to a memory device from a host, wherein the read command is assigned a host read identification (RID) number by the host that is incremented by a value equal to or greater than a quantity of a number of chunks of data associated with a previous read command and includes an indication that the number of chunks of data are to be returned in a particular order;
determining, via a controller on the memory device, a quantity of the number of chunks of data associated with the read command and assigning memory device read identification (RID) numbers to each of the number of chunks of data, wherein a memory device read identification (RID) number of a first chunk of the number of chunks of data is the host RID number; and
returning the number of chunks of data and the memory device RID numbers associated with the read command from the memory device to the host in the particular order.

23. The method of claim 22, wherein sending the read command includes sending a register address that is used to locate a register in the memory device that indicates the particular order in which the number of chunks of data are to be sent to the host.

24. The method of claim 22, wherein sending the read command includes sending an indication of the quantity of the number of chunks of data associated with the read command.

25. The method of claim 22, wherein assigning memory device RID numbers includes assigning the host RID number to a first chunk of data associated with the read command and then assigning memory device RID numbers sequentially to each subsequent chunk of data associated with the read command.

26. The method of claim 22, wherein the method includes sending the memory device RID numbers to the host along with each respective chunk of data to which the memory device RID numbers were assigned.

27. The method of claim 22, further including sending another read command to the memory device from the host, wherein the another read command is assigned another host read identification (RID) number by the host that is incremented by a value equal to or greater than the quantity of the number of chunks of data associated with the read command.

28. A method, comprising:
sending a number of read commands to a memory device from a host, wherein each of the number of read commands are associated with chunks of data and host read identification (RID) numbers, wherein a first host read identification (RID) number of a first read command of the number of read commands is incremented by a value equal to or greater than a quantity of chunks of data associated with a previous read command; and
wherein sending the number of read commands includes sending an indication that the chunks of data are to be returned in a particular order;

assigning memory device RID numbers to each of the chunks of data; and returning chunks of data and the memory device RID numbers associated with the number of read commands to the host sequentially as indicated by the read command, wherein a memory device read identification (RID) number for a first chunk of data of the chunks of data is the first host RID number.

29. The method of claim 28, wherein sending the number of read command includes sending register addresses with each of the number of read commands that that is used to locate registers in the memory device that indicate the particular order in which chunks of data associated with the number of read command are to be returned to the host.

30. The method of claim 28, wherein sending the number of read command includes sending the indication indicating that a particular chunk associated with the number of read commands is to be returned to the host with priority.

31. The method of claim 28, wherein sending the number of read command includes sending the indication indicating that the chunks of data associated with the number of read commands are to be returned in an order based on when the memory device accesses the chunks of data.

32. The method of claim 28, wherein sending the number of read command includes sending the indication that the chunks of data associated with the number of read commands are to be returned sequentially based on the memory device RID numbers assigned to the chunks of data.

* * * * *